United States Patent [19]

Okazaki et al.

[11] Patent Number: 5,345,559
[45] Date of Patent: Sep. 6, 1994

[54] BUS INTERFACE CIRCUIT FOR CONTROLLING DATA TRANSFER

[75] Inventors: Makoto Okazaki; Yuji Shibata; Hisamitsu Tanihira, all of Kawasaki; Yoshiaki Wakimura, Akishima, all of Japan

[73] Assignees: Fujitsu Limited, Kawasaki; Nippon Telegraph and Telephone Corporation, Tokyo, both of Japan

[21] Appl. No.: 730,809

[22] PCT Filed: Nov. 28, 1990

[86] PCT No.: PCT/JP90/01539
§ 371 Date: Jul. 29, 1991
§ 102(e) Date: Jul. 29, 1991

[30] Foreign Application Priority Data

Nov. 30, 1989 [JP] Japan ................................ 1-309023

[51] Int. Cl.5 .......................................... G06F 13/00
[52] U.S. Cl. ............................... 395/250; 364/DIG. 1; 364/DIG. 2; 364/239; 364/239.1; 364/239.3; 364/926.1; 364/927.92; 364/927.93
[58] Field of Search ............... 364/DIG. 1 MS File, 364/DIG.2 MS File; 395/200, 250, 275, 325, 400, 425, 500, 800

[56] References Cited

U.S. PATENT DOCUMENTS 5,220,651 6/1993 Larson .................... 395/250
5,224,213 6/1993 Dieffenderfer et al. ............. 395/250

FOREIGN PATENT DOCUMENTS 56-149084 11/1981 Japan .
61-95466 5/1986 Japan .
61-217859 9/1986 Japan .

Primary Examiner—Robert B. Harrell
Attorney, Agent, or Firm—Staas & Halsey

[57] ABSTRACT

A transmitter includes a transmitting buffer (21) for temporarily storing the information received from a first bus (11) of N (N is a natural number) bits width and a transmitting input distributer (22) and a transmitting output distributer (23) respectively provided in the input side and output side of the transmitting system buffer (21). A receiver includes a receiving buffer (31) for temporarily storing the information received from the second bus (12) and for sending the information to the first bus (11) and a receiving input distributer (32) and a receiving distributer (33) respectively provided in the input side and output side of the receiving buffer. The transmitting buffer (21) has at least m (m is a natural number) buffers of N bits width. When the second bus (12) has N bits width, the transmitting input distributer (22) sequentially inputs the information sent from the first bus to m buffers and the transmitting output distributer (23) sequentially extracts the information input to the buffers to send to the second bus (12). When the second bus (12) has mN bits width, the transmitting input distributer (22) sequentially inputs the information sent from the first bus (11) to m buffers and the transmitting output distributer (23) simultaneously extracts the information into the m buffers to send to the second bus (12).

4 Claims, 16 Drawing Sheets

BUS INTERFACE CIRCUIT FOR CONTROLLING DATA TRANSFER

BACKGROUND OF THE INVENTION

1. Field of the Invention

The present invention relates to a bus interface circuit and particularly to a bus interface circuit for controlling data transfer between buses in different bit width of the address lines and data lines.

2. Description of the related Art

In a computer system having a couple of buses, a bus interface is generally necessary between these buses. For instance, in the multiprocessor system, a plurality of central processing units (CPU), memories, and input-/output units (I/O units) which are common resources of these CPUs respectively provide first buses and connect these buses through the common second bus. In general, the first bus is called a local bus and the second bus is called a system bus. The bus interface is provided, corresponding to each local bus, for connecting the corresponding local bus to the system bus.

A computer system in these years tends to increase the amount of information to be transferred (address and a series of data) in a single transfer sequence by widening the bus width in order to improve system performance.

However, when bus width is widened, a number of signal lines naturally increases and the scale of hardware becomes large. Therefore, considering the required performance of the system, the width of second bus (system bus) must be determined to be of N bits (for example, 32 bits) or of to 2N bits (for example, 64 bits).

Thereby, it is effective for the bus interface to have the structure ready for both N bits mode and 2N bits mode. The present invention relates to a bus interface which may be used in common for such N-bit/2N-bit (including 3,4, . . . mN-bit) widths.

FIG. 1 is a schematic diagram of the system example to which the present invention is applied. In FIG. 1, a computer system 10 comprises a plurality of first buses (local bus) 11 and a second bus (system bus) 12 as the buses for information transfer. The first bus 11 is connected with the central processing unit (CPU) 14, memory (MEM) 15 and I/O unit 16.

These first bus 11 and second bus 12 are connected through bus interface (BS I/F) 13. In this case, the second bus 12 has the width, for example, of 32 (N= 32) bits but it must be expanded up to 2N (=64) bits when improvement of system performance is requested. Accordingly, it is convenient that the bus interface 13 may be used in common to N bits and 2N bits.

FIG. 3 is a timing chart indicating the operations in the transmitting side of the system, particularly in the side of a first bus (N bits) in the prior art of FIG. 2. S111, S112 in FIG. 3 denote the switching control signals (selecting REG100 or REG101) applied to the selector 110 of FIG. 2.

FIG. 4 is a timing chart indicating operations in the transmitting side of the system and particularly in the side of second bus (N bits) in the prior art of FIG. 2. S121, S122 in FIG. 4 denote the switching control signals (selecting REG102 or buffer 21) applied to the selector 120 of FIG. 2.

FIG. 5 is a timing chart indicating operations in the transmitting side of the system and particularly in the side of the second bus (2N bits) in the prior art of FIG. 2. S131, S132 in FIG. 5 denote the switching control signals (selecting REG105 or REG106) applied to the selector 130 in FIG. 2.

FIG. 6 is a timing chart indicating operations in the receiving side of the system and particularly in the side of the second bus (N bits) in the prior art of FIG. 2. S131, S132 in FIG. 6 denote the switching control signals (selecting REG105 or REG106) applied to the selector 130 in FIG. 2.

FIG. 7 is a timing chart indicating operations in the receiving side, particularly in the side of the second bus (2N bits) in the prior art of FIG. 7.

FIG. 8 is a timing chart indicating operations in the receiving system, particularly in the side of the first bus in the prior art of FIG. 2.

According to the bus interface of the prior art, when the second bus (system bus) 12 changes to 2N bits mode (FIG. 5) from the N bits mode (FIG. 4), a problem arises that the read cycle of buffer must be reduced to a half for improvement of the operation rate.

Moreover, this problem also occurs in the receiving system. Namely, when the second bus (system bus) 12 changes to 2N bits mode (FIG. 7) from the N bits mode (FIG. 6), the write cycle of buffer must be reduced to a half for improvement of the operation rate, as will be apparent from FIG. 6.

Such a problem results in a hardware disadvantage, in that a high speed buffer (for example, high speed RAM) must be used. Avoidance of such a disadvantage requires that the transfer cycle of the buffer must be doubled to lower the operation rate. Thereby, the data transfer capability must be reduced to a half; moreover such a disadvantage is in turn generated that the data processing capability of the system is reduced to a half.

SUMMARY OF THE INVENTION

It is therefore an object of the present invention to provide a bas interface circuit, considering the problems explained above in the prior art, which is capable of performing the interface function with the first bus (local bus) and second bus (system bus) without using a high speed buffer even when the bus width of the second bus (system bus) changes to 2N, 3N, 4N, . . . , mN bits from N bits.

It is another object of the present invention to provide a bas interface circuit which performs the interface function between the first bus (local bus) and second bus (system bus) in the same transfer cycle even when the bus width of the second bus (system bus) changes to 2N, 3N, 4N, . . . mN bits from N bits and also does not require any modification of data transfer part such as CPU, I/O unit, etc. connected to the bus interface circuit.

In the bus interface circuit of the present invention, a transmitter includes a transmitting buffer (21) for temporarily storing the information received from a first bus (11) of N (N is a natural number) bits width and a transmitting input distributor (22) and a transmitting output distributor (23) respectively provided in the input side and output side of the transmitting system buffer (21). A receiver includes a receiving buffer (31) for temporarily storing the information received from the second bus (12) and for sending the information to the first bus (11) and a receiving input distributor (32) and a receiving distributor (33) respectively provided in the input side and output side of the receiving buffer. The transmitting buffer (21) has at least m (m is a natural number) buffers of N bits width. When the second bus

(12) has N bits width, the transmitting input distributor (22) sequentially inputs the information sent from the first bus to m buffers and the transmitting output distributor (23) sequentially extracts the information, as input to the buffers, to send same to the second bus (12). When the second bus (12) has mN bits width, the transmitting input distributor (22) sequentially inputs the information sent from the first bus (11) to m buffers and the transmitting output distributor (23) simultaneously extracts the information, input into the m buffers, to send same to the second bus (12).

DESCRIPTION OF THE PREFERRED EMBODIMENTS

A preferred embodiment of the present invention will be explained in detail with reference to the accompanying drawings.

Figure 9:
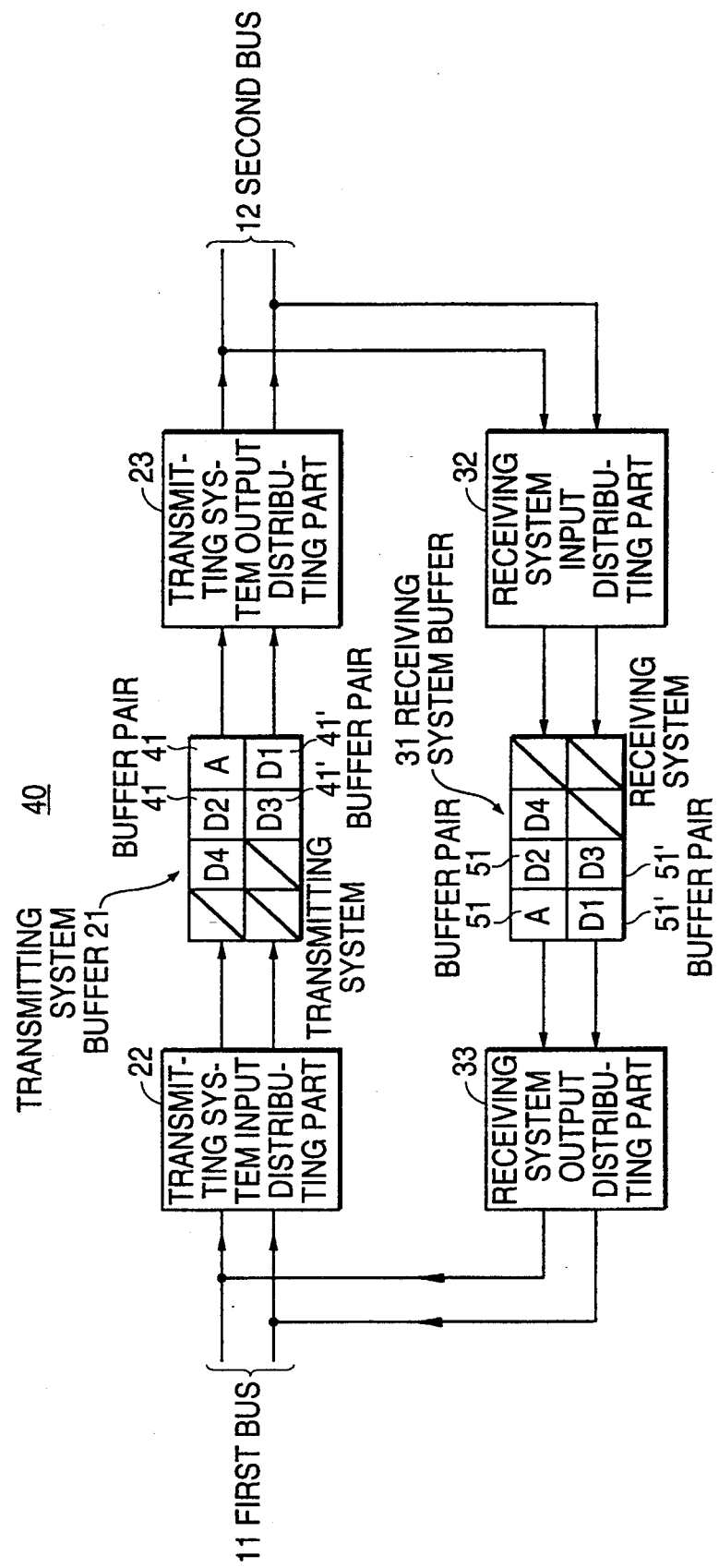
FIG. 9 is a diagram indicating the basic structure of a bus interface circuit of the present invention.

FIG. 9 is a diagram indicating the basic structure of a bus interface circuit of the present invention. In the transmitting system, a transmitting system buffer 21, a transmitting system input distributing part 22 and a transmitting system output distributing part 23 are provided. In the receiving system, a receiving system buffer 31, a receiving system input distributing part 32 and a receiving system output distributing part 33 are provided.

In regard to the transmitting system, the transmitting system buffer 21 is formed by a plurality of m buffers 41, 41' in the N bits width connected in series. In case the second bus 12 is formed in the N bits (for example, 32 bits) width, the transmitting system input distributing part 22 sequentially inputs the address and a series of data sent from the first bus 11 to the m buffers 41, 41', while the transmitting system output distributing part 23 sequentially extracts contents of these m buffers and sends same to the second bus 12.

In case the second bus 12 is formed in the mN bits width (m×32 bits), the transmitting system input distributing part 22 sequentially inputs the address and a series of data sent from the first bus 11 to each buffer, while the transmitting system output distributing part 23 simultaneously extracts the contents of these m buffers 41, 41' and sends same to the second bus. The structure of this transmitting system is also employed in the receiving system.

In regard to the receiving system, the receiving system buffer 31 is formed by cascade-connecting the receiving system buffer 31 and a plurality of m buffers 51, 51' in the N bits length. In case the second bus 12 is formed in the N bits (for example, 32 bits) width, the receiving system input distributing part 32 sequentially inputs the address and a series of data sent from the second buffer 12 to the m buffers 51, 51' and the receiving system output distributing part 33 extracts sequentially the contents of these m buffers and sends same to the first bus 11.

Moreover, in case the second bus 12 is formed of mN bits length (m×32 bits), the receiving system input distributing part 32 simultaneously inputs the address and a series of data sent from the second bus 12 to m buffers and the receiving system output distributing part 33 sequentially extracts the contents of these m buffers 51, 51' and sends same to the first bus 11.

With such a structure, a single read operation suffices for a single transfer of information.

Figure 1:
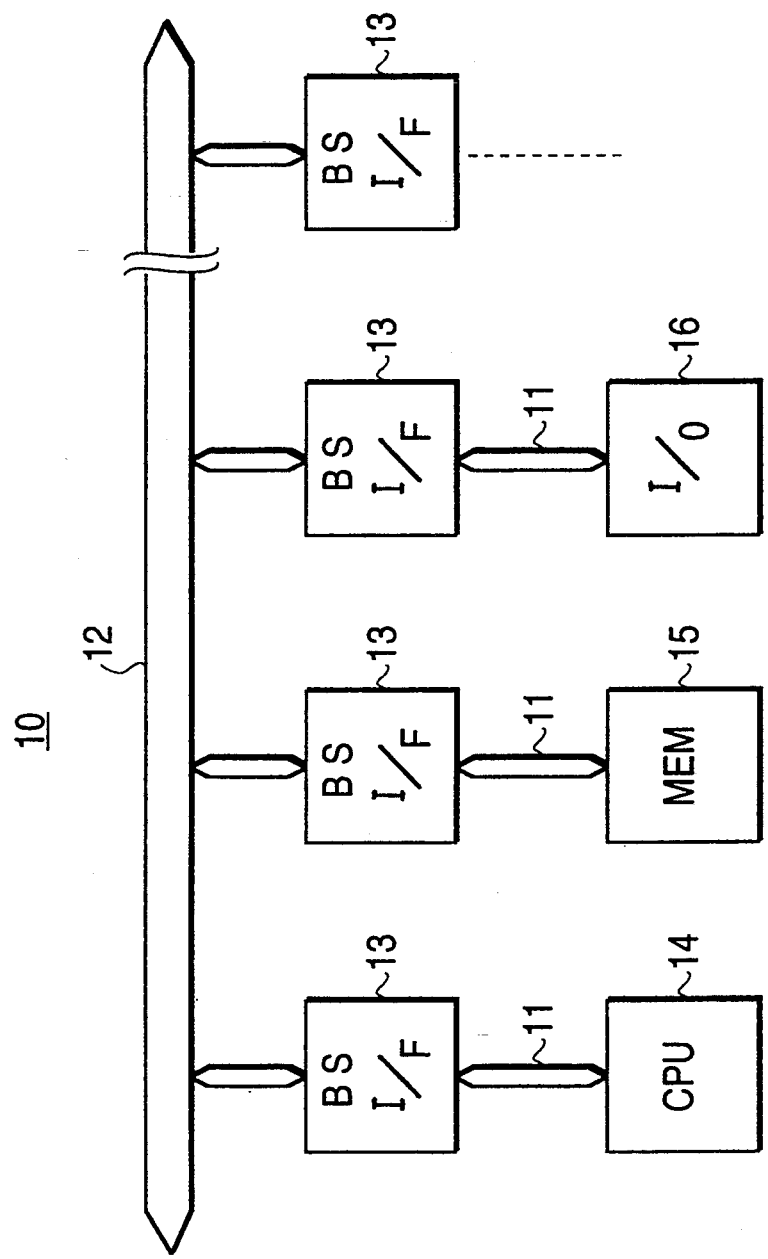
FIG. 1 is a schematic diagram indicating an example of a system to which the present invention is applied.
Figure 2:
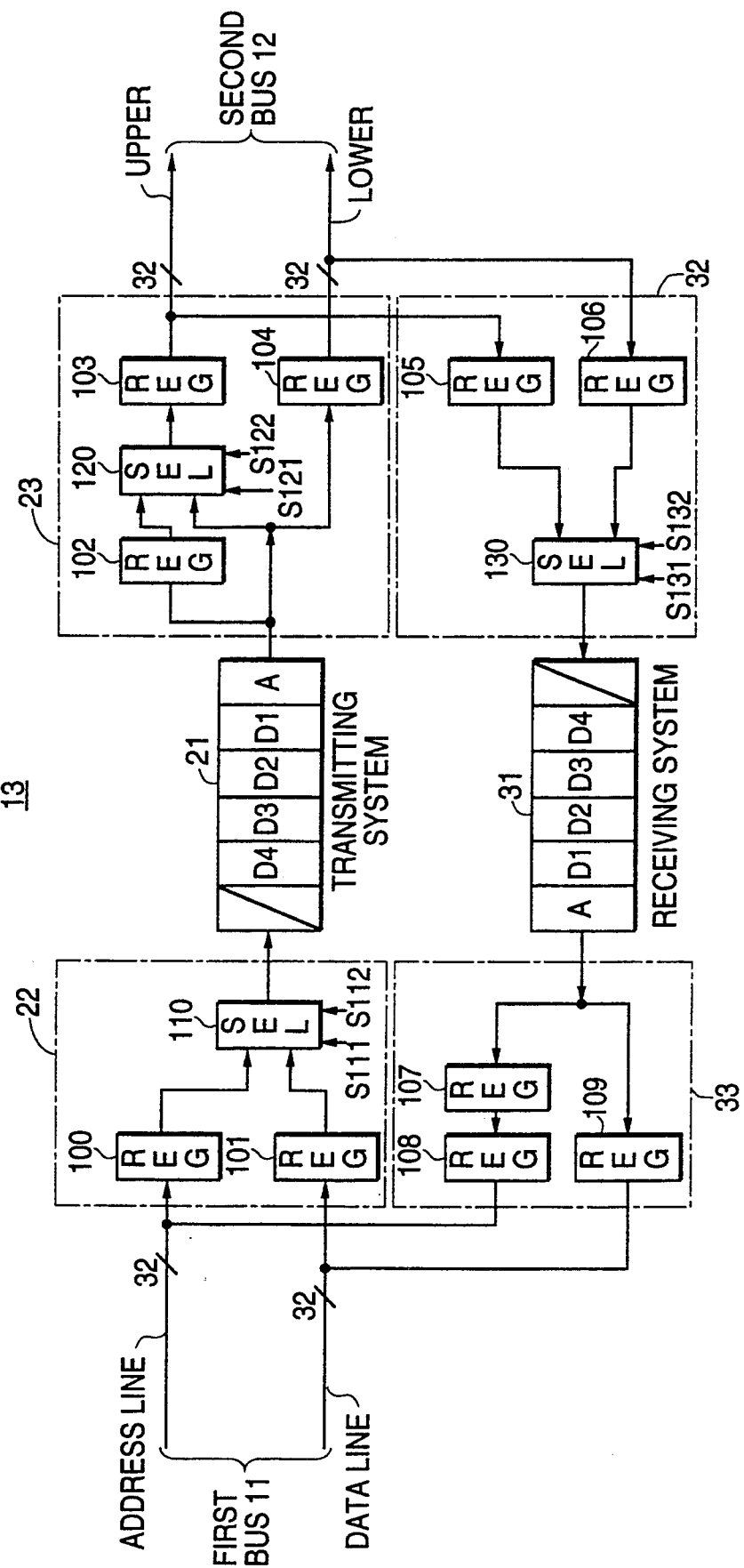
FIG. 2 is a circuit diagram indicating an example of a bus interface circuit of the prior art.
Figure 3:
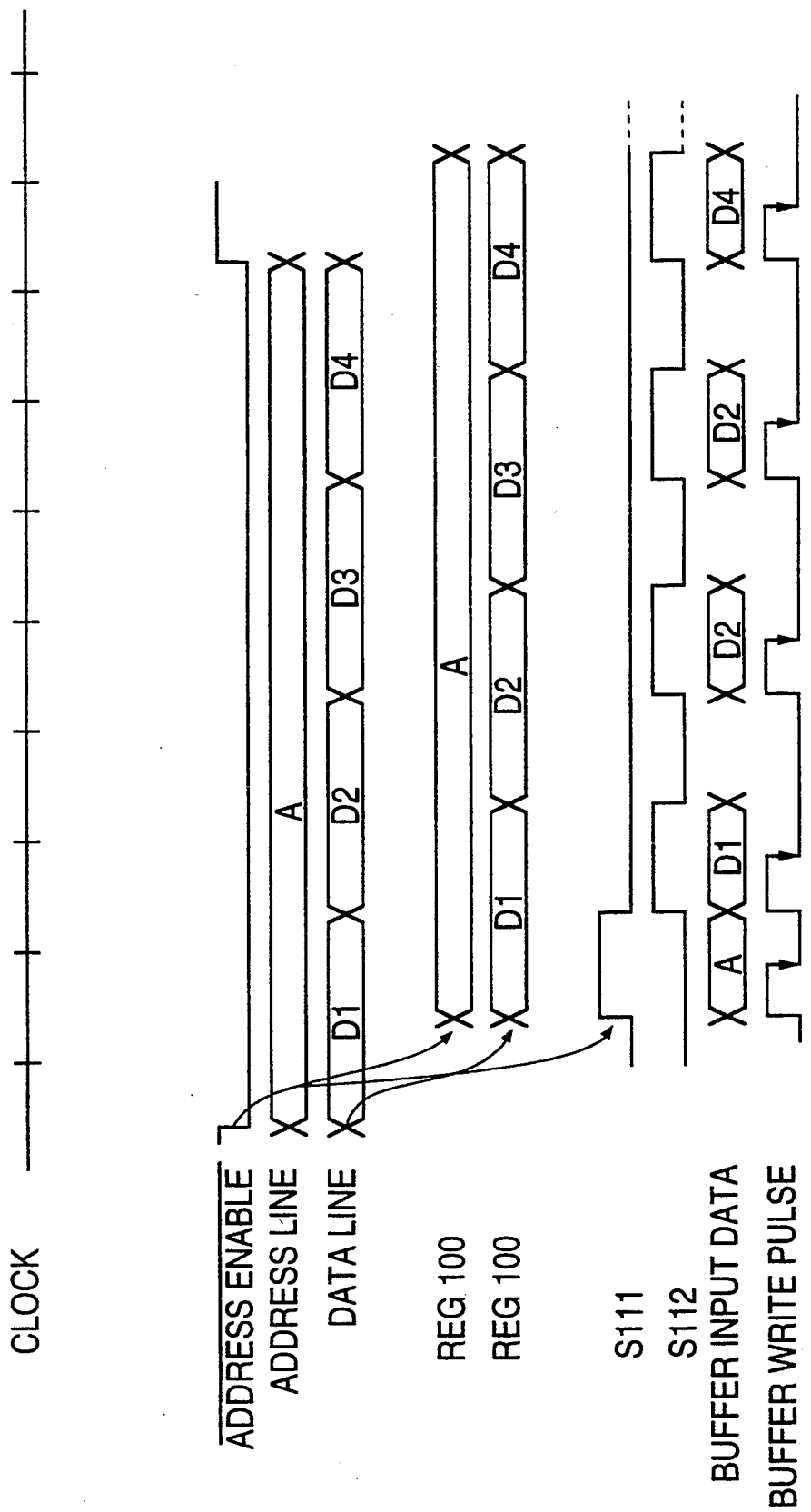
FIG. 3 is a timing chart indicating operations in the side of transmitting system, particularly in the side of the first bus (N bits) in the prior art of FIG. 2.

In the prior art shown in FIG. 2, twice read operations are required for a single transfer of information. Therefore, the read operation may be reduced to a half with the structure of FIG. 9.

Figure 10:
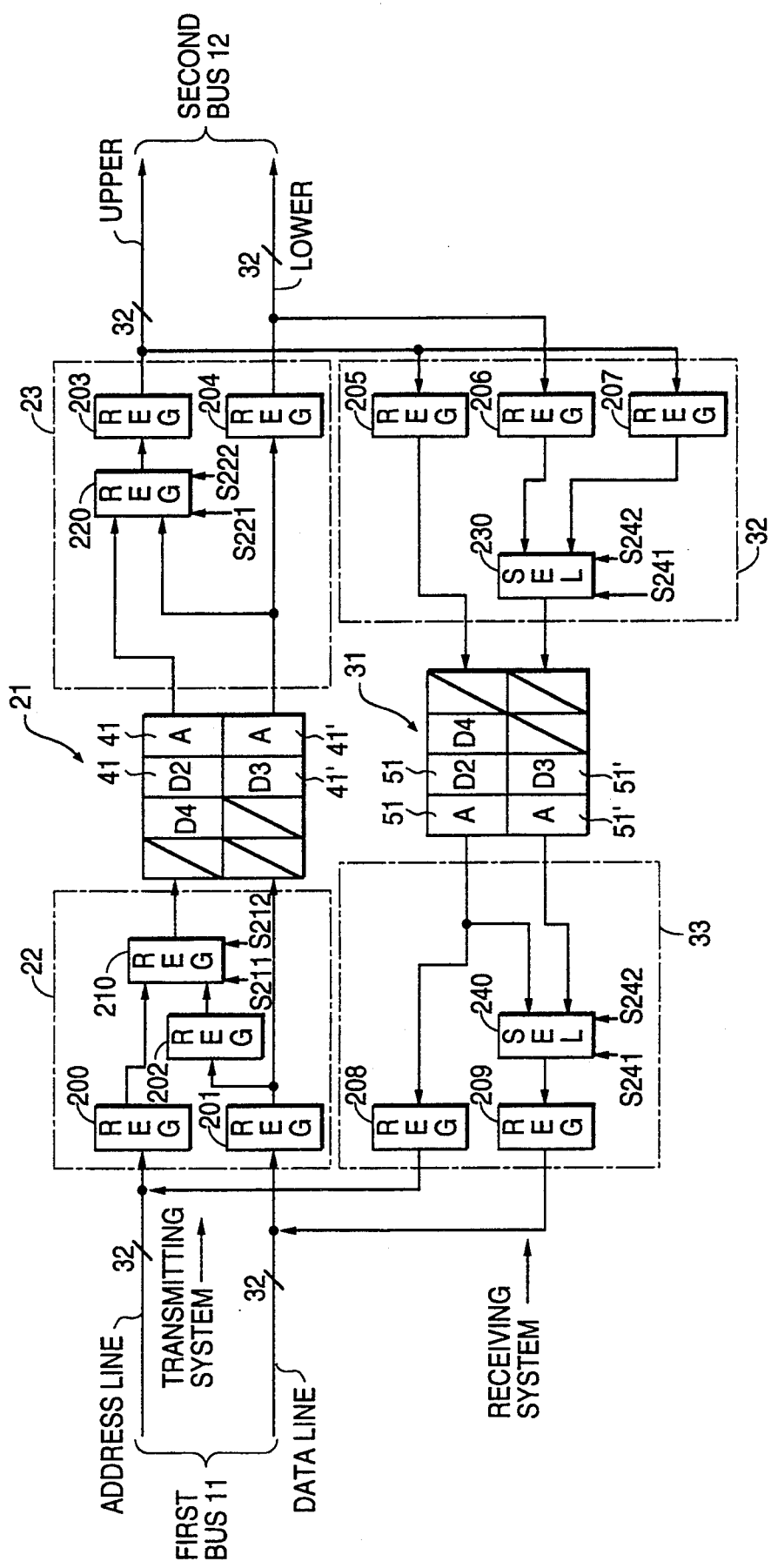
FIG. 10 is a circuit diagram indicating an embodiment of a bus interface circuit of the present invention.

FIG. 10 is a diagram indicating a detailed circuit structure of the bus interface circuit shown in FIG. 9. For simplification of the explanation, the bus width of the second bus is changed to N bits or to 2N bits.

In the bus interface circuit of FIG. 10, a plurality of buffer pairs 41, 41' of the upper N bits and lower N bits of the 2N bits are cascade-connected as the transmitting system buffer 21. The transmitting system input distribution part 22 comprises the registers (REG) 200, 201, 202 and selector (SEL) 210 and the transmitting system output distributing part 23 comprising the registers (REG) 203, 204 and selector (SEL) 220.

A plurality of buffer pairs (i.e. 51, 51' of the upper N bits and lower N bits, respectively) of the receiving buffer 31 are cascade-connected. The receiving system input distributing part 32 comprises the registers (REG) 205, 206, 207 and selector (SEL) 230, while the receiving system output distributing part 33 comprises the registers (REG) 208, 209 and selector (SEL) 240.

Operations of this bus interface 40 will become obvious from the timing charts shown in FIG. 11 to FIG. 16.

These timing charts of FIG. 11 to FIG. 16 respectively correspond to those of FIG. 3 to FIG. 8.

Figure 11:
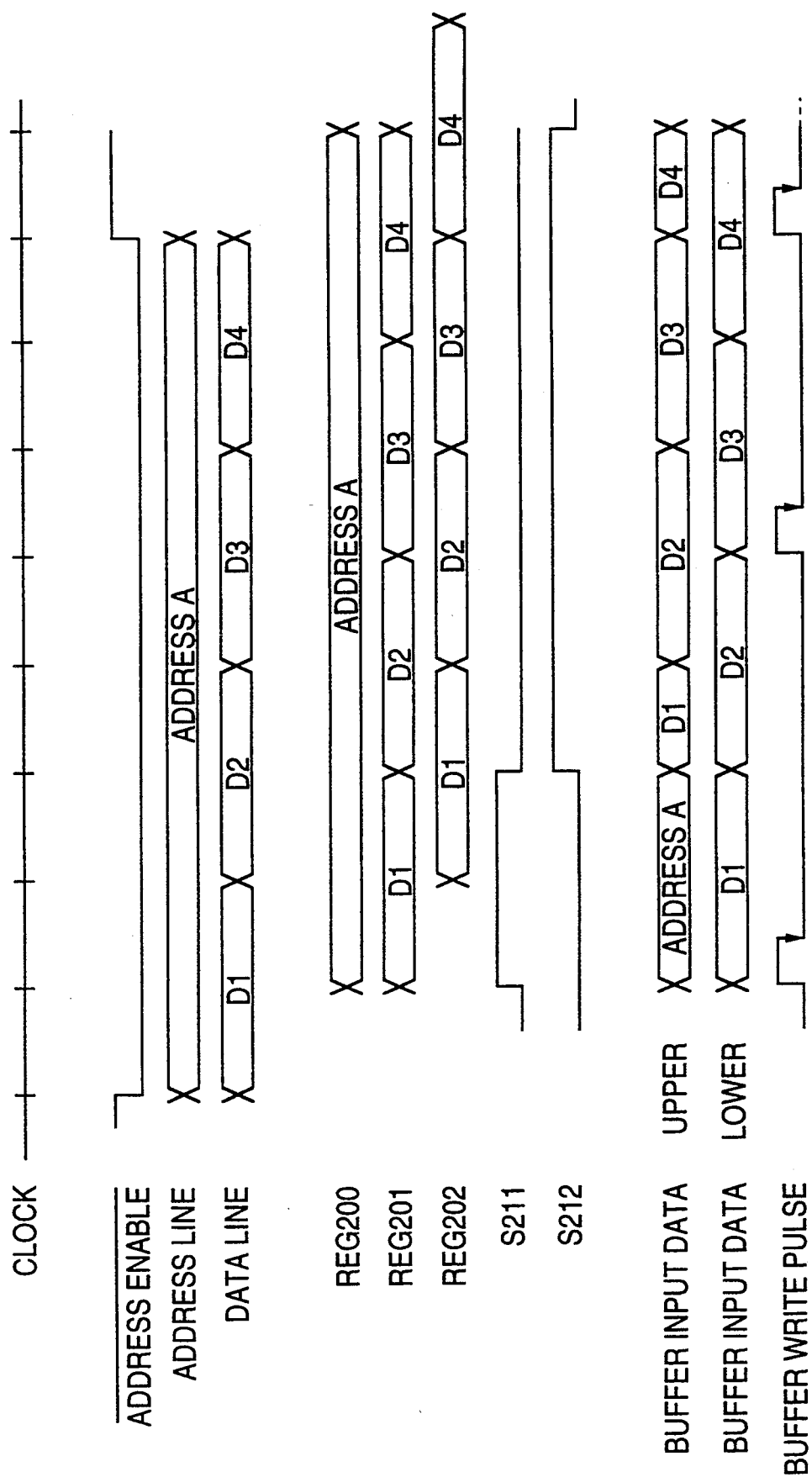
FIG. 11 is a timing chart indicating operations in the transmitting side of the system, particularly in the side of the first bus in FIG. 10.

FIG. 11 is a timing chart indicating operations in the transmitting side of the system, particularly in the side of the first bus shown in FIG. 10. S211, S212 in FIG. 11 are switching control signals applied to the selector 210 of FIG. 10 (selecting REG 200 or REG 202). At the rising edge of the signal S211, the contents of REG 200 are selected and at the rising edge of the signal S212, the contents of REG 202 are selected. The selected contents are input to the upper N bits of buffer 41 of transmitting system buffer 21.

Meanwhile, the contents of REG 201 are input in the lower N bits of buffer 41' and the transmitting system buffer 21 and these inputs are fetched to the buffer 21 by the buffer write pulse.

Figure 12:
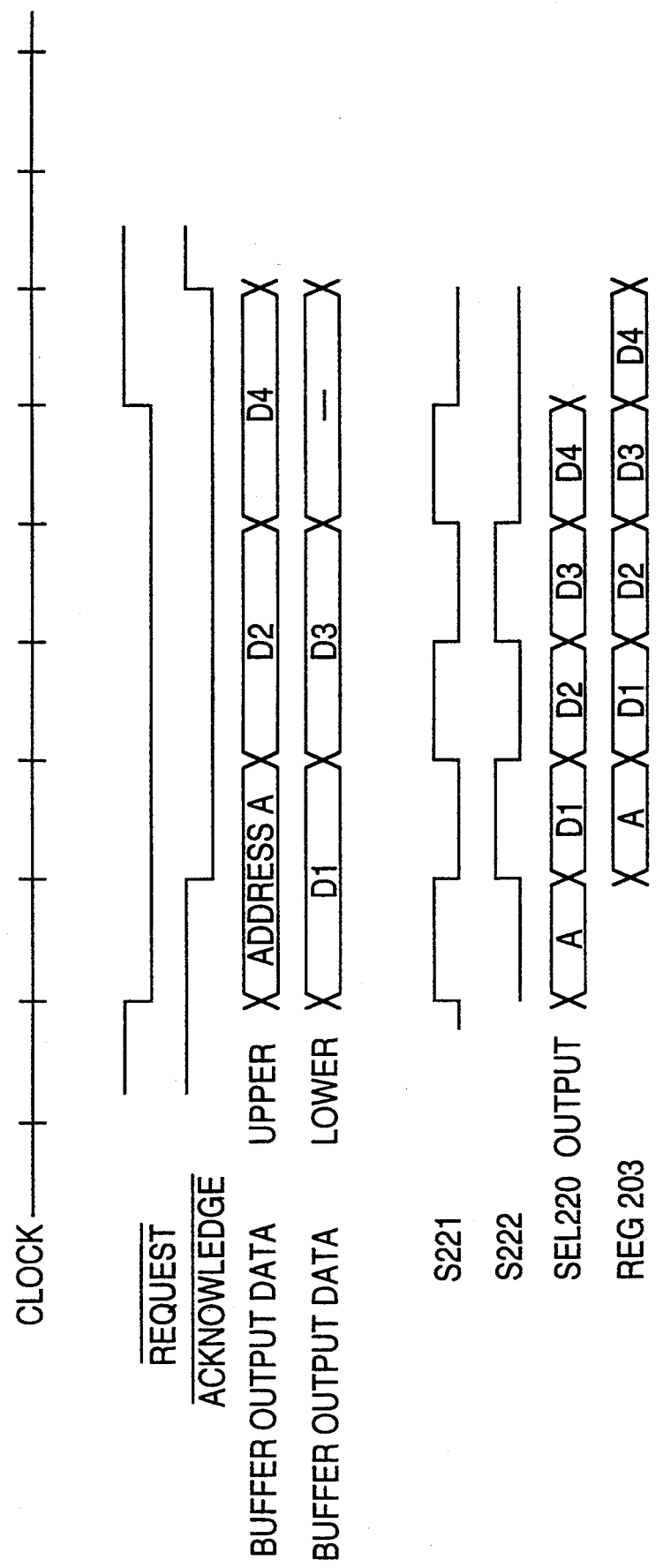
FIG. 12 is a timing chart indicating operations in the transmitting side of the system, particularly in the side of the second bus (N bits) in FIG. 10.

FIG. 12 is a timing chart indicating operations in the transmitting side of the system, particularly to the second bus (N bits) of the bus interface circuit of FIG. 10. S221, S222 in FIG. 12 are switching control signals (selecting the upper bit buffer 41 or lower bit buffer 41') applied to the selector 220 of FIG. 10. At the rising edge of the signal S221, the upper N bits buffer 41 of transmitting buffer 21 are selected and at the rising edge of the signal S222, the lower N bits buffer 41' of transmitting system buffer 21 are selected.

Thereby, the contents of the upper N bits and lower N bits buffers are alternately output to REG 203. In this case, the second bus 12 is in the N bits width (for example, 32 bits).

Figure 13:
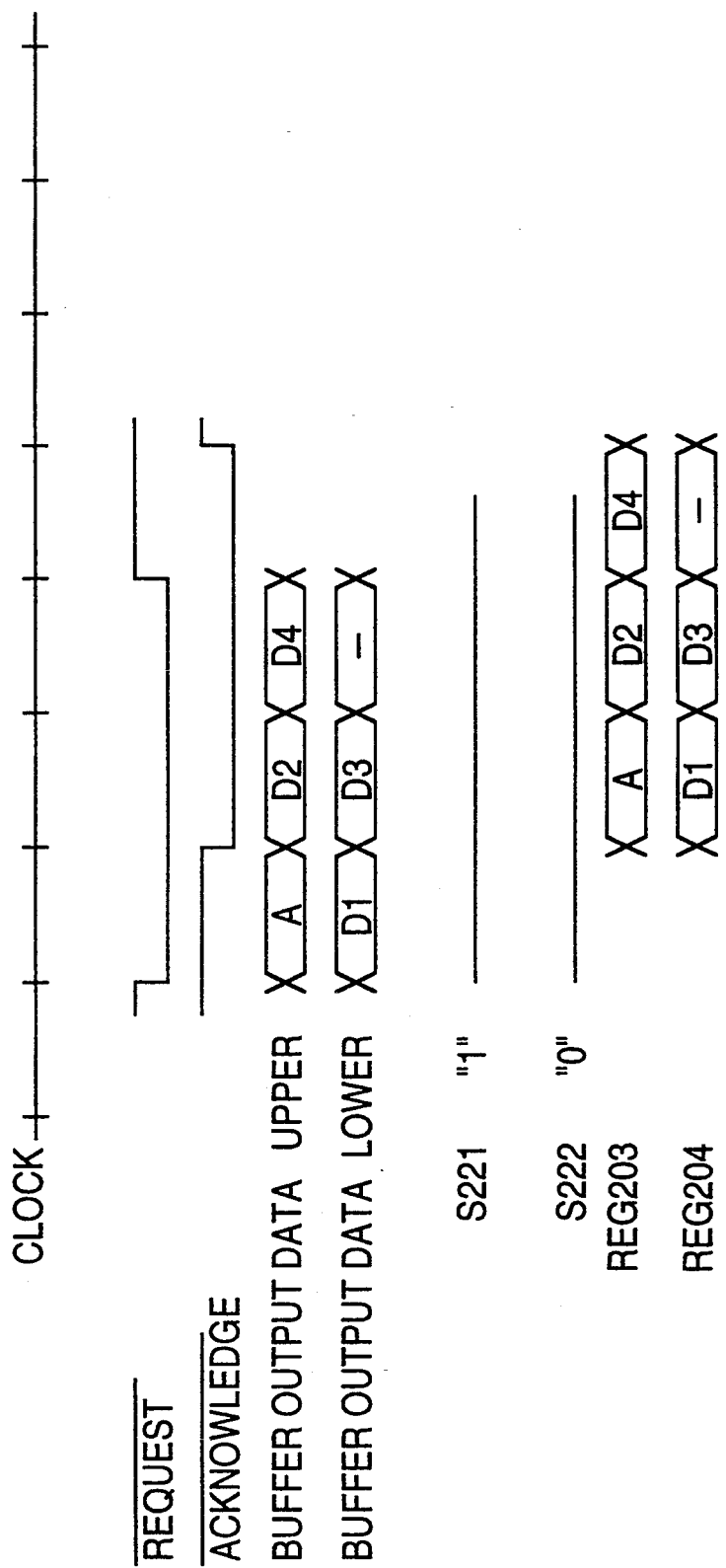
FIG. 13 is a timing chart indicating operations in the transmitting side of the system, particularly in the side of the second bus (2N bits) in FIG. 10.

FIG. 13 is a timing chart indicating operations in the transmitting system, particularly to the second bus (2N bits) of the bus interface circuit of FIG. 10. When the second bus 12 is 2N bits (for example, 64 bits), only the signal S221 becomes "1" and continues in the high level (the signal S222 becomes "0" and continues in the low level). Contents of the upper N bits buffer 41 are transmitted to the register REG 203 and simultaneously contents of lower N bits buffer 41' are transmitted to the REG 204. Moreover, contents of these registers REG 203, 204 are simultaneously output to the second bus 12.

Figure 4:
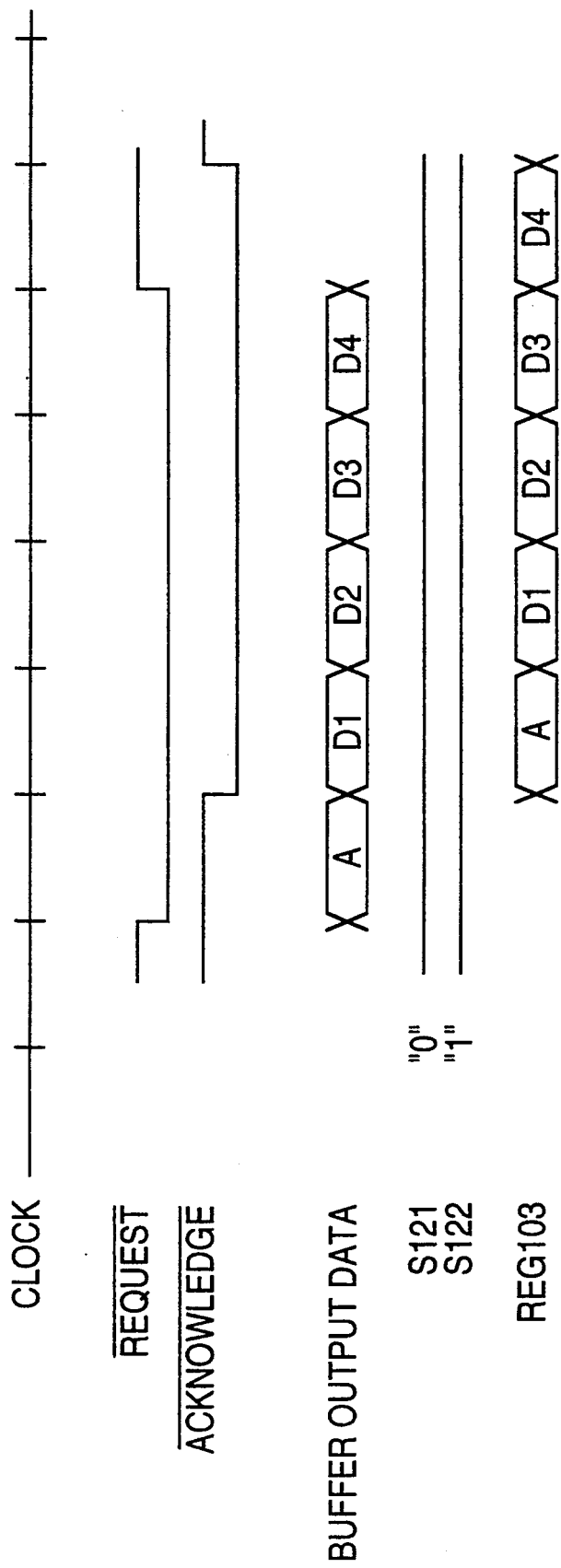
FIG. 4 is a timing chart indicating operations in the transmitting side of the system, particularly in the side of a second bus (N bits) in the prior art of FIG. 2.
Figure 5:
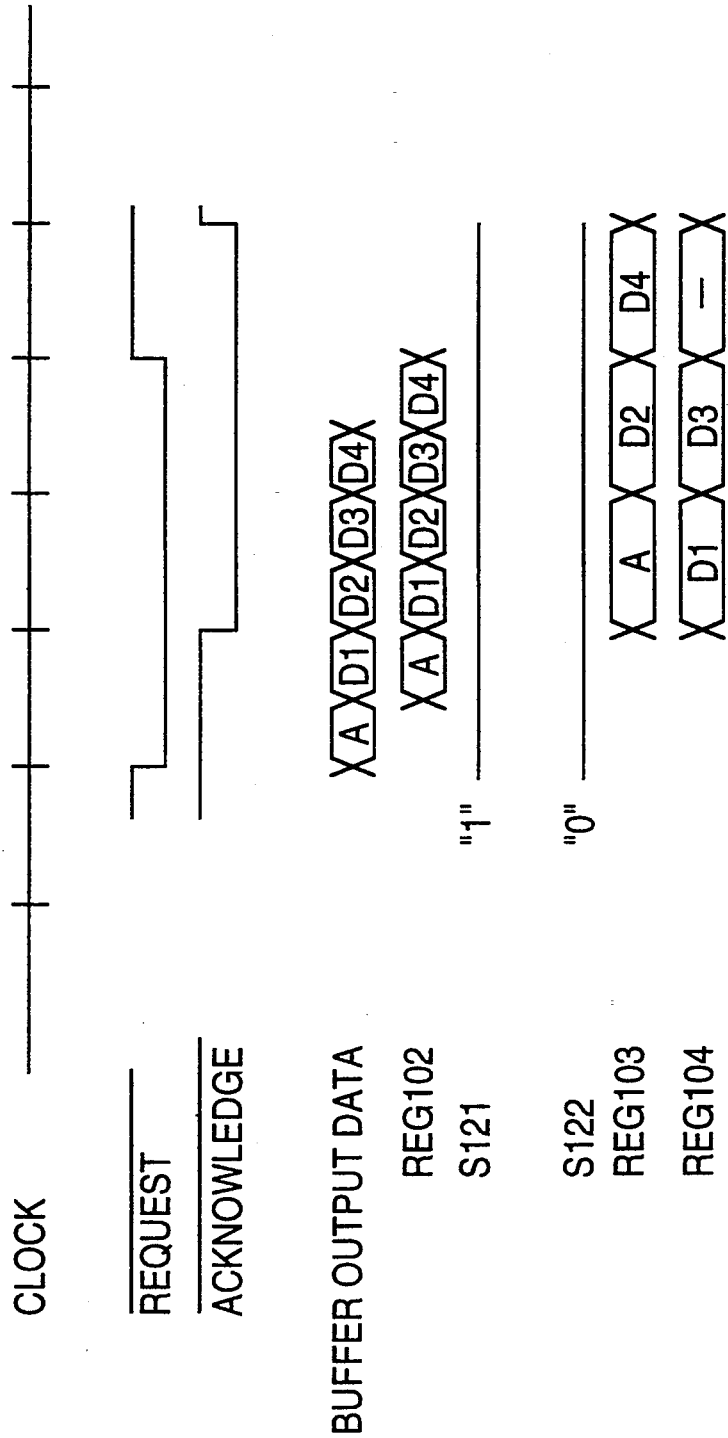
FIG. 5 is a timing chart indicating operations in the transmitting side of the system, particularly in the side of a second bus (2N bits) in the prior art of FIG. 2.

In FIG. 5, regarding the buffer output data, the read cycle of buffer is reduced to a half (½) in comparison with that in FIG. 4, realizing an improvement in operating speed. However, in FIG. 13, the read cycle of the buffer is similar to that of FIG. 12 and thus speed-up of the read cycle is unnecessary.

Figure 14:
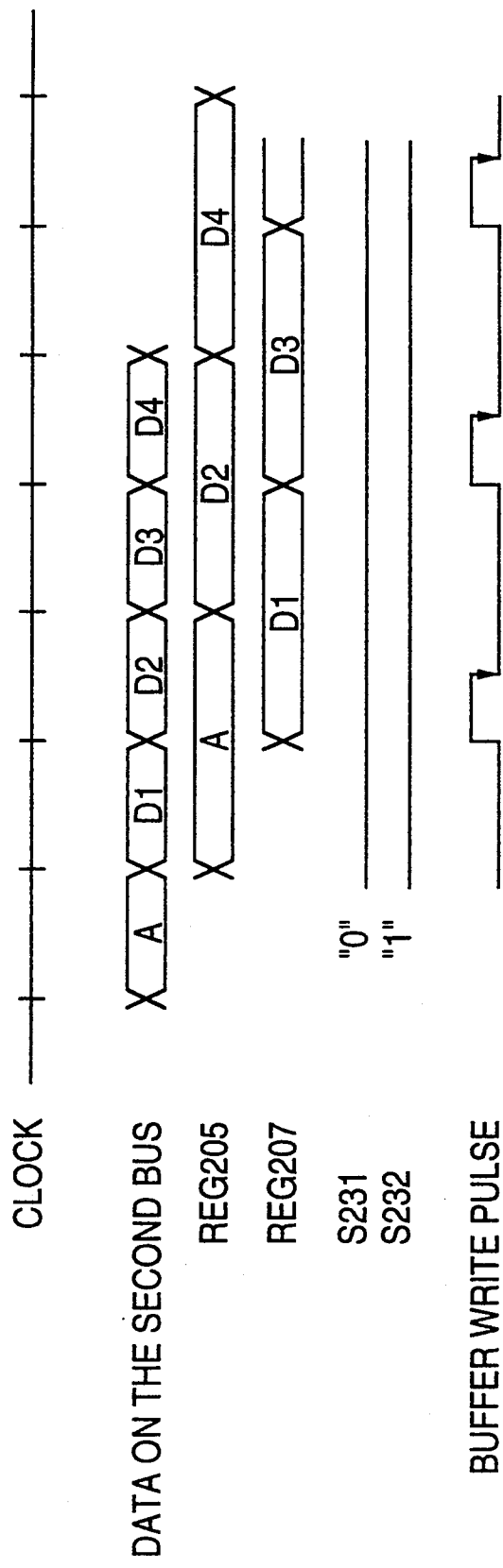
FIG. 14 is a timing chart indicating operations in the receiving side of the system, particularly in the side of the second bus (N bits) in FIG. 10.

FIG. 14 is a timing chart indicating operations of the receiving system, particularly the second bus (N bits) in the bus interface circuit 40 of FIG. 10. When the second bus 12 is N bits (for example, 32 bits) mode, the signal S231 is continuously set to the low level "0" (the signal S231 is continuously set to the high level "1") and contents (the upper N bits of second bus 12) of the register (REG) 207 are selected. Contents of REG 207 and contents (upper N bits of second bus 12) of register (REG) 205 are assigned alternately to the upper N bits buffer 51 and lower N bits buffer 51' by the buffer write pulse. The clock of REG 205 and the clock of REG 207 have the common frequency equal to ½ of the basic clock and the phases thereof are shifted mutually by as much as one clock.

Figure 15:
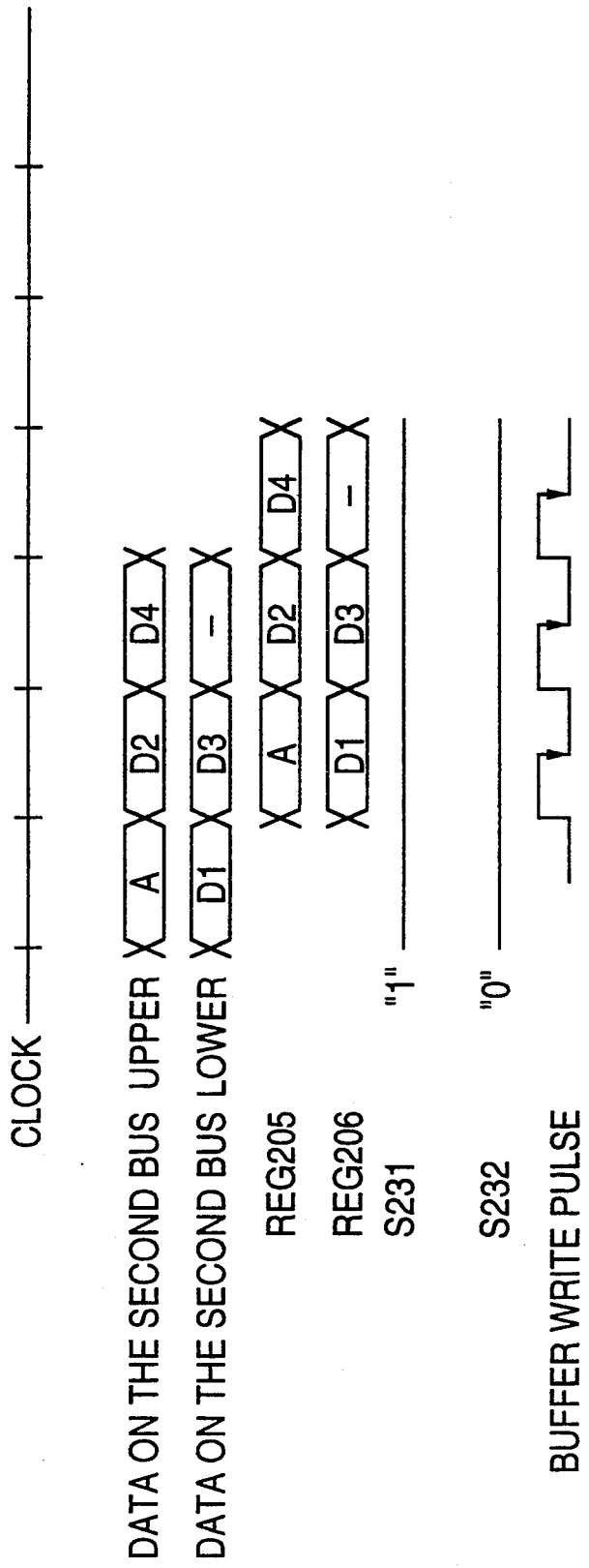
FIG. 15 is a timing chart indicating operations in the receiving side of the system, particularly in the side of the second bus (2N bits) in FIG. 10.

FIG. 15 is a timing chart indicating operations in the receiving system, particularly in the second bus (2N bits) in the bus interface circuit of FIG. 10. When the second bus 12 is in the 2N bits (64 bits) mode, the signal S231 is continuously set to the high level "1" (signal S232 is continuously set to the low level "0") and the contents (lower N bits of second bus 12) of register (REG) 206 are selected. Contents of REG 206 and contents of REG 205 (upper N bits of second bus 12) are simultaneously fetched respectively by the upper buffer 51 and lower buffer 51' by the buffer write pulse.

Figure 6:
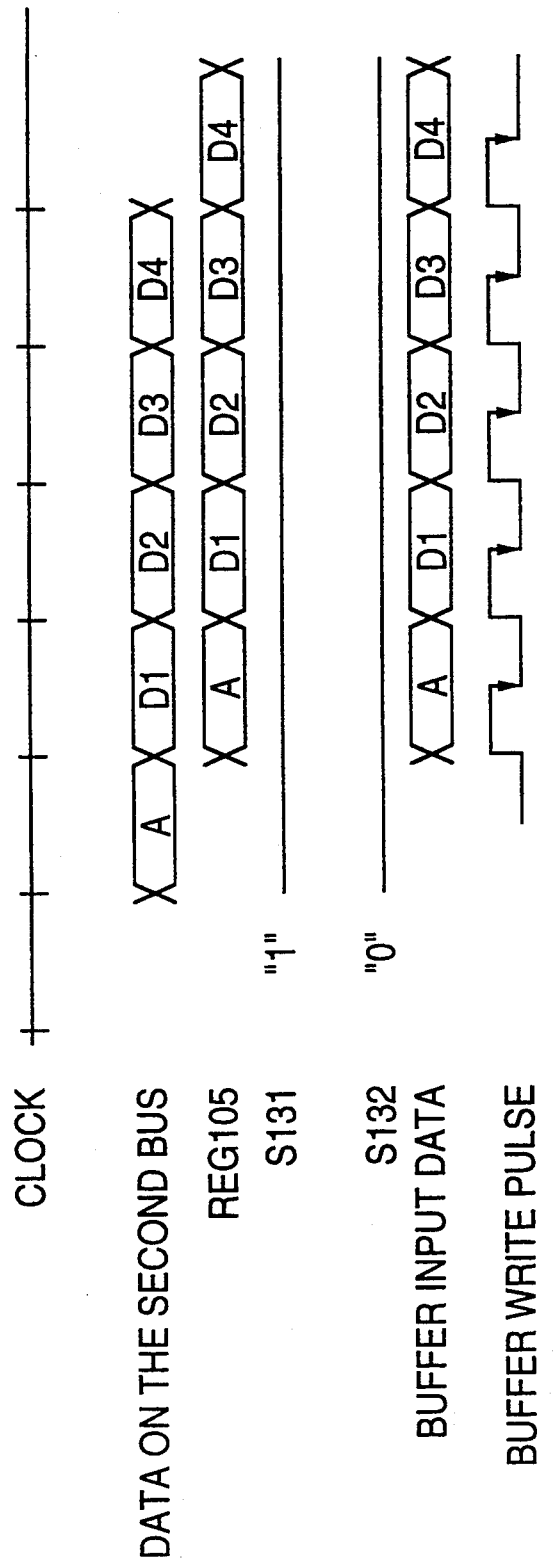
FIG. 6 is a timing chart indicating operations in the receiving side of the system, particularly in the side of a second bus (N bits) in the prior art of FIG. 2.
Figure 7:
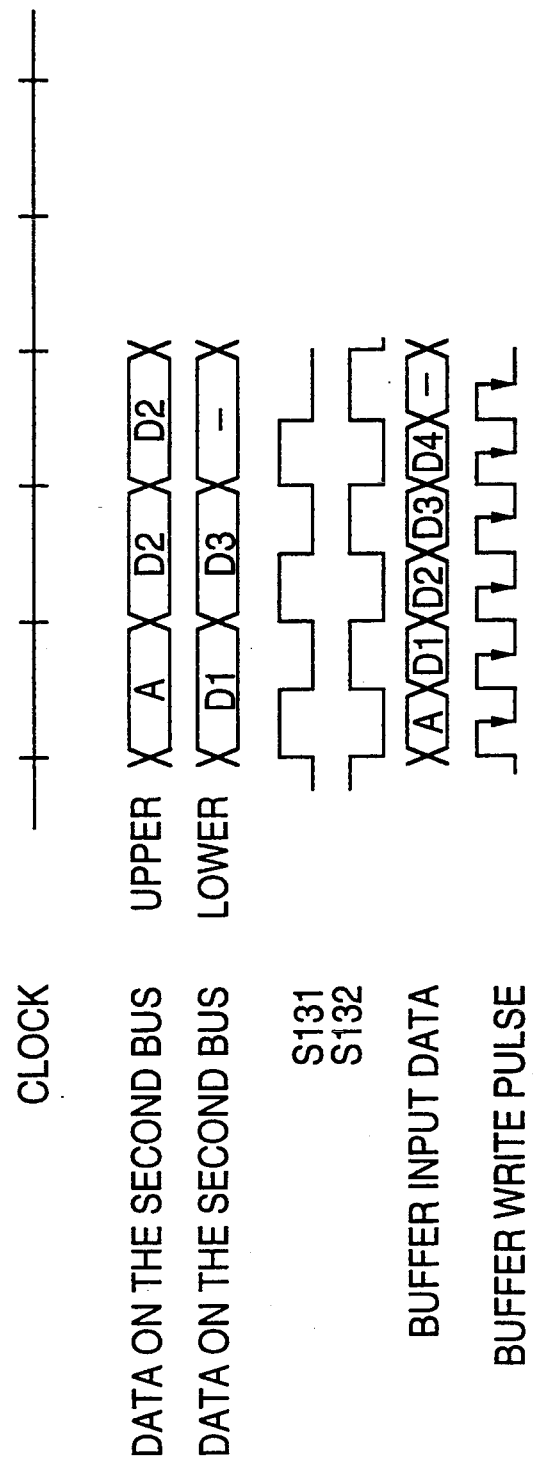
FIG. 7 is a timing chart indicating operations in the receiving side of the system, particularly in the side of a second bus (2N bits) in the prior art of FIG. 2.
Figure 8:
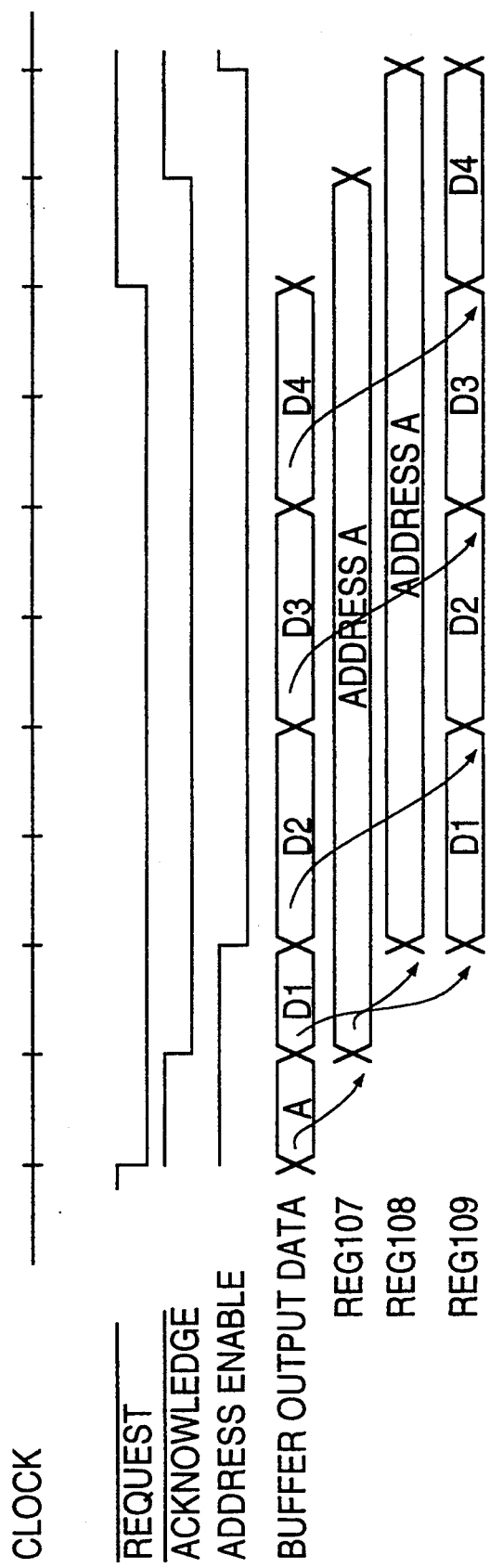
FIG. 8 is a timing chart indicating operations in the receiving side of the system, particularly in the side of a first bus in the prior art of FIG. 2.

In FIG. 7, the write cycle of the buffer is reduced to a half (½) in comparison with that of FIG. 6 (as shown in the column of the buffer write pulse), realizing an improvement in operation speed. But, in FIG. 15, the write cycle of the buffer is equal to that in FIG. 14.

Figure 16:
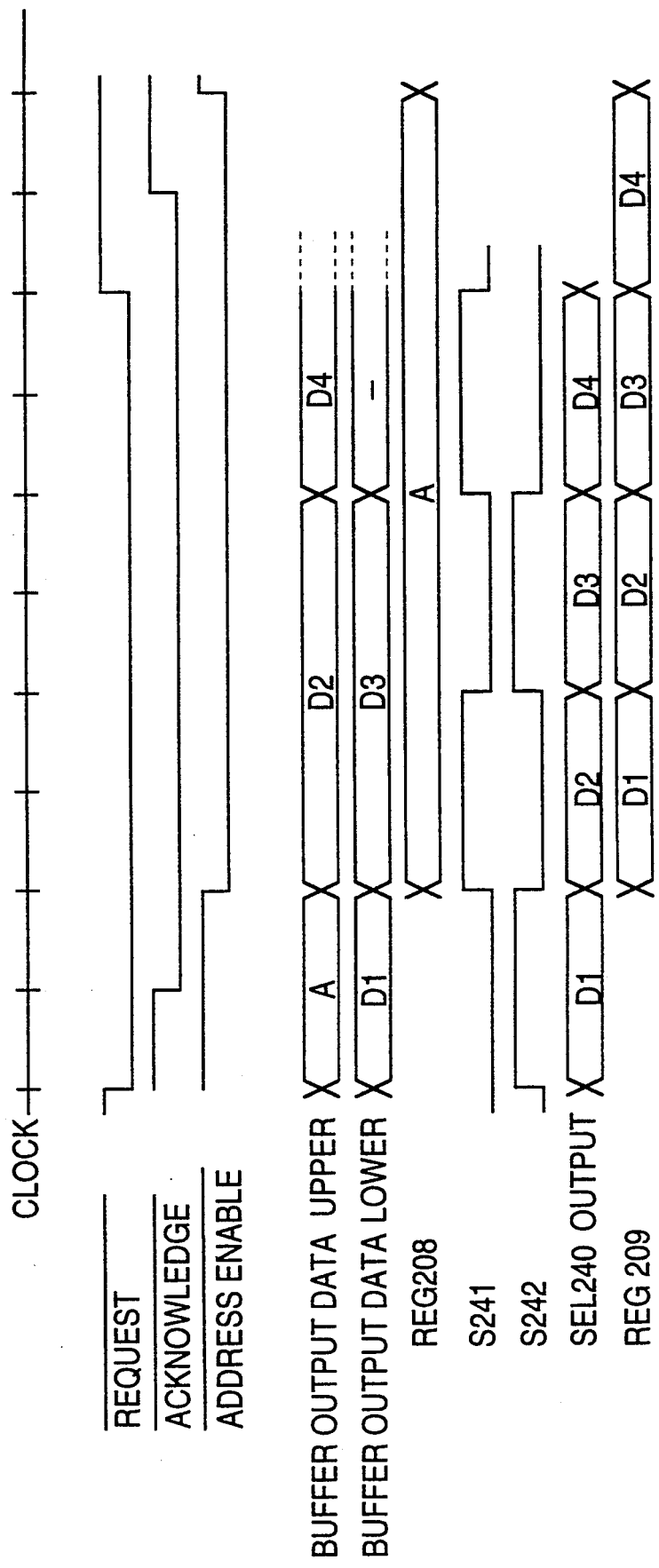
FIG. 16 is a timing chart indicating operations in the receiving side of the system, particularly in the side of the first bus in FIG. 10.

FIG. 16 is a timing chart indicating operations in the receiving system, particularly the first bus in the bus interface circuit of FIG. 10. In FIG. 16, S241, S242 are switching control signals applied to the selector (SEL) 240. The upper N bits buffer 51 side is selected at the rising edge of S241 and the lower N bits buffer 51' side at the rising edge of S242. Therefore, the output of SEL 240 has the waveform as shown in FIG. 16. The register (REG) 209 sends a series of data D1, D2, . . . with a delay of one clock to the data line. The corresponding address is held in the REG 208 and is then sent to the address line. REG 208 latches addresses in the address enable function.

As explained above, according to an embodiment of FIG. 10, the present invention is flexibly applicable to the N bits mode system and 2N bits mode system without changing the transfer cycle.

Moreover, since writing from the local bus (first bus) is carried out alternately to the upper buffer and lower buffer, even in the case of the N bits mode and 2N bits mode, the write speed can always be kept constant. Read operation from the buffer is conducted simultaneously for 2N bits but conducted alternately for N bits but the transfer cycle on the bus is equal even for N bits and 2N bits. Therefore, it is no longer necessary to change the data transfer speed of the CPU, I/O unit connected to the bus.

We claim:

1. A bus interface circuit, comprising:
   a first bus having N bits in width, where N is a natural number;
   a second bus;
   transmitting means comprising:
   a transmitting buffer having at least m sub-buffers where m is a natural number, each of the m sub-buffers having N bits in width;
   first input distributing means, connected to the transmitting buffer, for receiving information including data and addresses from the first bus and inputting the information to the transmitting buffer, and
   first output distributing means, connected to the transmitting buffer, for receiving the information from the transmitting buffer and outputting the information to the second bus;
   receiving means comprising:
   a receiving buffer;
   second input distributing means, connected to the receiving buffer, for receiving the information from the second bus and inputting the information to the receiving buffer, and
   second output distributing means, connected to the receiving buffer, for receiving the information from the receiving buffer and outputting the information to the first bus;
   the first input distributing means receiving the information from the first bus and inputting sequentially the information to the m sub-buffers;

the first output distributing means, having at least first and second states, wherein each of the first and second states is selected by control signals indicative of the second bus having mN bits in width;

the first state comprising the second bus having mN bits in width, wherein m is equal to 1.0, and the first output distributing means sequentially extracting the information from the m transmitting buffers and sequentially transmitting the information to the second bus; and the second state comprising the second bus having mN bits in width, wherein m is not equal to 1.0, and the first output distributing means simultaneously extracting the information from the m sub-buffers and simultaneously transmitting the information to the second bus.

2. A bus interface circuit, comprising:

a first bus having N bits in width, where N is a natural number;

a second bus;

transmitting means comprising:
  a transmitting buffer having an upper buffer and a lower buffer;
  first input distributing means, connected to the transmitting buffer, for receiving information from the first bus and inputting the information to the transmitting buffer, and
  first output distributing means, connected to the transmitting buffer, for receiving the information from the transmitting buffer and outputting the information to the second bus;

receiving means comprising:
  a receiving buffer;
  second input distributing means, connected to the receiving buffer for receiving the information from the second bus and inputting the information to the receiving buffer, and
  second output distributing means, connected to the receiving buffer, for receiving the information from the receiving buffer and outputting the information to the first bus;

the first input distributing means receiving the information from the first bus and inputting alternately the information to the upper buffer and lower buffer;

the first output distributing means, having first and second states, wherein each of the first and second states is selected by control signals indicative of the second bus, having a bit width;

the first state comprising the second bus having N bits in width and the first output distributing means alternately extracting the information from the upper buffer and the lower buffer and alternately transmitting the information to the second bus; and the second state comprising the second bus having 2N bits in width and the first output distributing means simultaneously extracting the information from the upper buffer and the lower buffer and simultaneously transmitting the information to the second bus.

3. A bus interface circuit, comprising:

a first bus having N bits in width, where N is a natural number;

a second bus;

transmitting means comprising:
  a transmitting buffer;
  first input distributing means, connected to the transmitting buffer, for receiving information including addresses and data from the first bus and inputting the information to the transmitting buffer, and
  first output distributing means, connected to the transmitting buffer, for receiving the information from the transmitting buffer and outputting the information to the second bus;

receiving means comprising:
  a receiving buffer having m sub-buffers wherein m is a natural number, each of the m sub-buffers having N bits in width;
  second input distributing means, connected to the receiving buffer, for receiving the information from the second bus and inputting the information to the receiving buffer, and
  second output distributing means, connected to the receiving buffer, for receiving the information from the receiving buffer and outputting the information to the first bus;

the second input distributing means, having at least first and second states, wherein each of the first and second states is selected by control signals indicative of the second bus having mN bits in width;

the first state comprising the second bus having mN bits in width, wherein m is equal to 1.0, and the second input distributing means sequentially receiving the information from the second bus and sequentially transmitting the information to m sub-buffers;

the second state comprising the second bus having mN bits in width, wherein m is not equal to 1.0, and the second input distributing means simultaneously receiving the information from the second bus and simultaneously transmitting the information to m sub-buffers; and the second output distributing means sequentially extracting the information from the m receiving buffers and sequentially transmitting the information to the first bus.

4. A bus interface circuit, comprising:

a first bus having N bits in width, where N is a natural number;

a second bus;

transmitting means comprising:
  a transmitting buffer;
  first input distributing means, connected to the transmitting buffer, for receiving information from the first bus and inputting the information to the transmitting buffer, and
  first output distributing means, connected to the transmitting buffer, for receiving the information from the transmitting buffer and outputting the information to the second bus;

receiving means comprising:
  a receiving buffer having an upper buffer and a lower buffer;
  second input distributing means, connected to the receiving buffer, for receiving the information from the second bus and inputting the information to the receiving buffer, and
  second output distributing means, connected to the receiving buffer (31), for receiving the information from the receiving buffer and outputting the information to the first bus;

the second input distributing means, having first and second states wherein each of the first and second states is selected by control signals indicative of the second bus, having a bit width;

the first state comprising the second bus having N bits in width and the second input distributing means alternately receiving the information from the second bus and alternately transmitting the information to the upper buffer and the lower buffer;

the second state comprising the second bus having 2N bits in width and the second input distributing means simultaneously inputting the information received from the second bus and simultaneously transmitting the information to the upper buffer and the lower buffer; and the second output distributing means alternately extracting the information from the upper buffer and lower buffer and transmitting the information to the first bus.

* * * * *

UNITED STATES PATENT AND TRADEMARK OFFICE
CERTIFICATE OF CORRECTION

PATENT NO. : 5,345,559
DATED : September 6, 1994
INVENTOR(S) : Makoto Okazaki, et al It is certified that error appears in the above-indentified patent and that said Letters Patent is hereby corrected as shown below:

Column 1, line 11, change "related" to --Related--;

line 33, delete "to".

Column 2, line 31, change "moreover" to --moreover,--;

lines 38 and 45, change "bas" to --bus--;

line 50, after "of" insert --the--.

Column 4, line 31, change "buffer" to --bus--;

line 57, after "and" (first occurrence only) insert --the--.

Signed and Sealed this

Twentieth Day of December, 1994

Attest:

BRUCE LEHMAN

Attesting Officer     Commissioner of Patents and Trademarks